Figure 1:
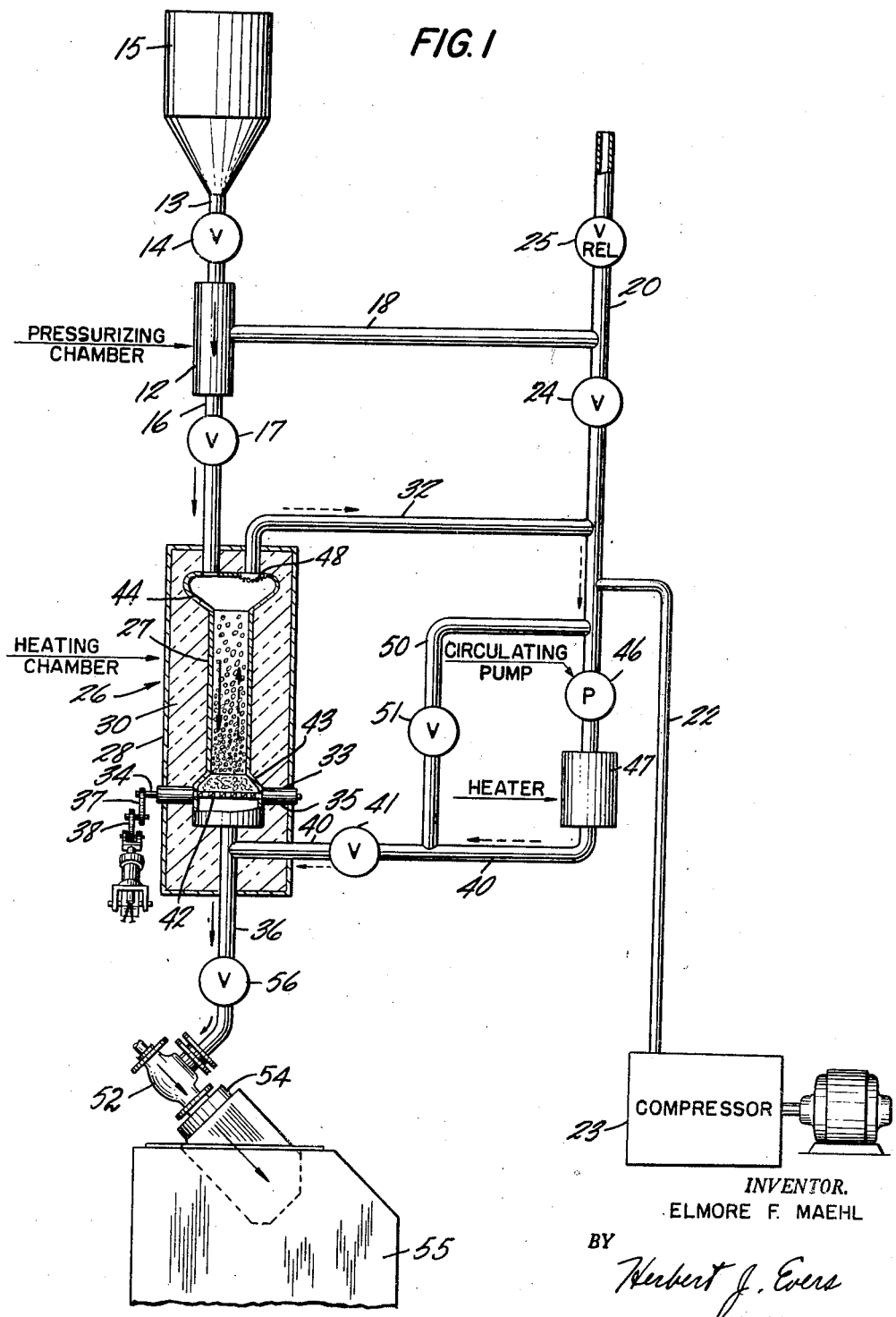

April 14, 1964

E. F. MAEHL 3,128,690

CEREAL PUFFING APPARATUS

Filed Feb. 15, 1961

2 Sheets-Sheet 1

INVENTOR.
ELMORE F. MAEHL
BY
Herbert J. Evers
ATTORNEY

April 14, 1964 E. F. MAEHL 3,128,690
CEREAL PUFFING APPARATUS

Filed Feb. 15, 1961 2 Sheets-Sheet 2

INVENTOR.
ELMORE F. MAEHL
BY
Herbert J. Evers
ATTORNEY

United States Patent Office 3,128,690
Patented Apr. 14, 1964

3,128,690
CEREAL PUFFING APPARATUS
Elmore F. Maehl, Fanwood, N.J., assignor to National Biscuit Company, a corporation of New Jersey
Filed Feb. 15, 1961, Ser. No. 89,508
7 Claims. (Cl. 99—238)

This invention relates to improvements in the heat treating of granular food products, and more particularly to a novel apparatus for the continuous production of puffed cereal products such as puffed rice, puffed wheat and other related grains.

In the prior art it has been common practice to puff cereal grains such as rice, wheat, corn and the like, by means of an explosion process in which the grains are cooked with steam in a chamber of a puffing gun for a predetermined length of time. After a quantity of grain has been sufficiently heated to produce gelatinization, and the pressure and temperature within the gun chamber have reached a suitable level, the chamber is suddenly opened to atmospheric pressure, thus effecting a sudden expansion or "puffing" of the grain.

Various disadvantages arise with the use of this method, however, and apparatus and processes heretofore employed have been unsatisfactory for a number of reasons. Because of the time involved in bringing the cereal grains to the gelatinization point, this operation is costly and time-consuming. The length of time required to gelatinize each batch of starting material is also not conducive to a continuous method of production. Furthermore, a steam heating process tends to make the cereal grains stick together or adhere to the wall of the gun chamber. Consequently, it is difficult to obtain a product of uniform appearance and consistency. These and other disadvantages make it necessary to provide other methods of production which are more reliable and better suited to the high production needs of our present technology.

It is, therefore, an important object of this invention to provide an improved apparatus for puffing cereal grains which will operate at an increased rate of production, and produce a more uniform appearing puffed cereal product.

It is also another object of this invention to provide an apparatus for puffing cereal grains which does not necessarily depend upon the introduction of steam to effect gelatinization of the cereal grain, and which can be adapted to operate on a substantially continuous basis.

Yet another object is to provide in the heat treatment of a granular food product an apparatus which will utilize the inherent moisture of the food product to develop gelatinization.

It is also an important object to provide a cereal puffing system in which the cooking and puffing of the cereal grains are conducted in separate apparatus.

Figure 2:
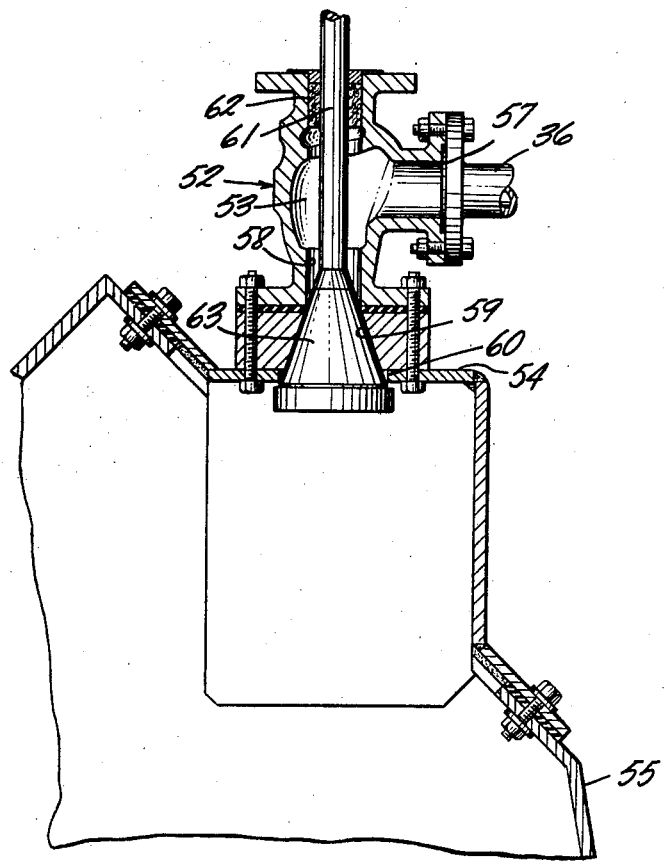

Other objects, features and advantages of the present invention will be readily apparent from the following detailed description of a preferred embodiment thereof taken in conjunction with the accompanying drawings, in which:

FIG. 1 is a schematic flow diagram illustrating an apparatus embodying the principles of this invention; and FIG. 2 is an enlarged sectional view of the puffing gun apparatus employed in the flow diagram of FIG. 1.

The invention will be described in connection with the puffing of cereal grains, such as wheat, rice, or corn, but it is to be understood that it is not intended to restrict the invention thereto, since the invention is susceptible of application in the heat treatment of other food products.

According to my invention, the above objects may be accomplished in my novel puffed cereal manufacturing system. In this system, instead of gelatinizing a batch of cereal grains in a high temperature, high pressure, steam atmosphere, the cereal grains are gelatinized by utilizing the moisture that is normally present in the cereal grains. For this purpose, the cereal grains are gelatinized by heating a fluidized bed of the cereal grains at an elevated pressure with a gaseous heating medium such as air. Preferably, the cereal grains are preliminarily subjected to an increase in pressure in the absence of imposed moisture. A fluidized bed of this pressurized cereal grain is then heated for a period sufficient for the moisture contained in the cereal grains to effect gelatinization thereof. Thereafter, the product of gelatinization is abruptly depressurized so as to effect a corresponding expansion of the cereal grain to produce the final food product in puffed form. By heating the cereal grains in a fluidized bed state in a relatively dry atmosphere until gelatinization occurs, it has been found that the total time of gelatinization consumed is substantially shortened over the conventional gelatinization period. Moreover, the steps involved in the gelatinization may be carried out in two or more vessels so that when the cereal grain in one vessel reaches the pressure condition necessary for initiating gelatinization, it may be passed to another vessel for the completion of the gelatinization process. While the gelatinization of the cereal grain is being completed in the second vessel, additional cereal grain can be prepared for gelatinization in the first vessel. Thus, the steps in the gelatinization are continuously performed, although each individual vessel operates intermittently on a batch basis in the gelatinization process. The moisture required for the gelatinization of the cereal grain is preferably derived from the moisture that is normally present in the whole cereal grain. However, an outside source of moisture may be supplied to supplement this, if so desired.

Referring now to FIG. 1, there is shown a presure chamber or vessel 12 provided with a grain feed inlet line 13 having a charging valve 14 for the reception of grain kernels from a grain supply source 15, and a grain outlet conduit 16 having a discharge valve 17 for the discharge of pressurized grain. The pressure vessel 12 may be of chemically inert metal which does not react with or affect the food product being processed therein, such as stainless steel. The movement of the grain during the course of treatment, the present invention is shown in FIG. 1 by a heavy solid arrow to indicate the direction of flow.

To achieve the gelatinization of the grain kernels, for example rice, in accordance with the invention, rice is preliminarily pressurized prior to being heated to the desired gelatinization temperature. This is accomplished by the provision of a suitable gas pipe 18, extending through a gas-tight opening in the pressure vessel 12. High pressure gas, usually compressed air, is introduced into the pressure vessel 12 through the gas pipe 18 from a manifold line 20 by means of a supply line 22 which operates to transfer compressed air from a compressor 23 to said manifold 20. A closure valve 24 in the line 20 controls the flow of compressed air into the vessel 12. This procedure is accompanied by the shutting of the valve 14 and also valve 25 in line 20 by manual or automatic means.

For the purpose of relieving the gas pressure in vessel 12, prior and during the charging thereof, valve 25 is opened, allowing such pressure to exhaust through lines 18 and 20 to atmosphere.

Atmospheric conditions having been thus restored to pressurizing vessel 12, valves 17 and 24 are closed and valve 14 is opened in order to proceed with grain charging.

As soon as the cereal grains in the pressure vessel 12 are at the proper pressure level, they are passed to an adjoining heating chamber 26, by opening the discharge valve 17 in line 16 which connects the pressure vessel 12 with the heating chamber 26. This heating chamber preferably comprises a double walled container having an elongated inner pressure vessel 27 of chemically inert metal, such as stainless steel, for receiving the pressurized rice grain from the pressure vessel 12, and a surrounding shell or jacket 28 of suitable metal material, for example, carbon steel, completely encompassing the inner vessel, and providing an intervening insulation space 30 filled with a suitable insulation material, such as asbestos. However, the vessel 27 may be wrapped with a suitable thickness of insulation and the outer jacket 28 dispensed with, if so desired.

The heating chamber parts are formed as illustrated to provide a pair of outlets, one through the upper portion of the inner vessel 27 by way of the outlet line 32 and the other through the lower portion of the vessel 27 through a movable plate or valve 33, preferably of the butterfly type, which fits the contour of the vessel wall. The valve 33 has a stem part 34 extending through a bearing support 35 disposed transversely in the insulation space 30. Rotation of this valve 33 about the axis of the stem 34 into open position discharges the contents of the inner vessel 27 into a puffing gun inlet line 36. Secured to one end of the stem 34 is a projecting arm 37 which may be pivotably secured to a link 38 that in turn may be actuated, either manually or automatically, as by a solenoid switch, to rotate the valve 33 into the desired open or closed position.

For the purpose of gelatinizing the cereal grains in the inner vessel 27, hot air or other suitable heating gas is passed through a hot air inlet line 40 having a control valve 41 and into the interior of the inner vessel through a plurality of apertures 42 in the butterfly valve 33. The heating air leaves the vessel 27 via the outlet line 32.

In order to achieve an effective system for uniformly heating the cereal grains, the inner vessel 27 should be of such size as to provide a fluid bed of grains when the heating gas is drawn therethrough. In carrying out the invention, there is provided a convergent section 43, at the entrance to the inner vessel to increase the velocity of the heating gas in its upward travel through the heating column. Conversely, a divergent section 44 is provided at the opposite end of the inner vessel to reduce the velocity of the heating gas. Thus, a loose mass or fluidized bed of cereal stock to be gelatinized is continuously shaken and uniformly exposed to rising air currents.

The flow of compressed air that is to be used in the heating vessel 27 is preferably through the conduit 22 into the manifold 20 where it is drawn through a circulating pump 46 and a heater 47 into the inlet line 40. The exhaust pipe 32 recycles the hot air into the manifold 20. Since the pressure of the heating gas in the exhaust pipe 32 is slightly higher than the pressure in the manifold 20, the exhaust heating air will flow into the manifold and toward the low pressure side of the pump 46. A bubble screen 48 disposed at the entrance to the exhaust pipe 32 prevents the egress of any light, smaller sized rice grains from the heating vessel 27.

A by-pass line 50 having a suitable by-pass valve 51 is provided in the manifold 20 to allow continuous operation of the pump 46 when the heating air inlet valve 41 is closed.

The heating gas flow cycle is shown in FIG. 1 by a dotted arrow to show direction of flow.

Upon completion of the heating operation, the cereal is admitted in the chamber of a puffing gun 52 under approximately the same pressure as in the pressure chamber 12 and the heating chamber 26. There, the pressure is suddenly reduced, causing an explosion or puffing of the cereal to the desired degree.

A preferred construction of the puffing gun 52 is shown in FIG. 2. This construction comprises a tubular barrel-like casing or puffing gun chamber 53, of steel or other high strength material, which may be fitted or bolted to the wall 54 of a bin or hopper 55.

The cereal grain is supplied under pressure through a valve 56 in the inlet line 36 into a receiving opening 57 into the gun chamber 53, and the products of expansion are discharged from the gun chamber through a discharging opening 58 and thence through a divergent nozzle 59 into an opening 60 in the wall of the receiving bin 55 which is maintained at atmospheric pressure or under a slight vacuum.

The operating mechanism of the puffing gun comprises a shaft 61 which extends the length of the puffing gun through an airtight end seal or gasket 62 into the interior of the gun chamber 53 where it passes through the discharge opening 58. When the interior of the chamber 53 is under operating pressure the discharge opening 58 is closed by a suitable abutting valve at the end of the shaft 61, preferably a conically shaped valve 63 which seats in the nozzle 59. This valve also abuts the edge of the bin opening 60. Opening of the valve, 63, which is effected by a longitudinal movement of the shaft 61, causes a sudden imbalance or reduction in pressure and is accompanied by an outrush of the high pressure air into the clearance space around the conical valve 63. Simultaneously, the cereal grains are hurled vigorously through the discharge opening into the receiving hopper while undergoing the puffing transformation occasioned by the abrupt change in pressure.

The means for reciprocably moving the shaft 61 to open and close the valve 63 may be performed by suitable electrical, pneumatic or hyraulic apparatus (not shown) or by hand if so desired.

In operation, the following sequence of steps is performed, either manually or automatically in the following timed sequence. Valve 14 is opened for a sufficient period of time to admit a predetermined, metered quantity of rice, for example, from the supply hopper 15 into the pressure chamber 12. Valves 14 and 25 are then closed, and valve 24 is opened to bring the pressure in the chamber 12 to the proper level. During this entire operation valve 17 remains closed.

While the pressure conditions in the vessel 27 can vary between approximately 175 and 250 p.s.i. in the case of most cereal grains, a desirable pressure range is approximately 200 to 225 p.s.i. and a preferred pressure is approximately 200 to 210 p.s.i.

It will be realized, however, that the pressure range will vary depending upon the particular food material that is being processed. For example, rice, or oats may be heat treated at pressures slightly above atmospheric pressure.

Once the desired pressure in the pressure vessel 12 has been obtained, valve 17 is opened to admit the pressurized rice grains into the heating vessel 27. During the admission of the cereal into said vessel 27, the valve 24 remains open to equalize the pressure in said pressure vessel 12 via the pipe 18. The cereal falls by gravity into the heating vessel 27 and is deposited upon the apertured butterfly valve plate 33 which is in the closed position. Thereupon, the valve 17 is closed and valves 24 and 25 are closed and opened, respectively, to permit entry of a succeeding batch of cereal grain into the pressure vessel. This depressurizes the vessel 12 so that valve 14 can be opened to admit the succeeding batch of cereal grain during the period that the previous batch of cereal is being heated in the heating vessel 27.

To circulate heating air in the chamber 27, the valve 41 in line 40 is opened, thereby effecting a closed circuitry of heating air consisting of lines 40, 32, and the portion of the manifold 20 having the pump 46. This circulation of heating air is shown by the dotted arrows in FIG. 1.

It will be realized that the heating period will vary with the temperature and pressure, but generally this step is carried out at a temperature between about 450 to 650° F. for about 1 to 5 minutes, desirably at a temperature between about 475 to 550° F. for about 1½ to 3 minutes, and preferably about 480 to 525° F. for about 2 to 2½ minutes.

Upon the completion of the heating step, three valves are operated approximately simultaneously. Countercurrent flow of air in vessel 27 is terminated by shutting valve 41 and opening by-pass valve 51. At the same time the butterfly valve 33 is briefly opened to permit the gelatinized rice to be pushed through valve 56 into the gun chamber 53 under the impetus of the line pressure in pipe line 32. It should be noted that during the heating cycle, valve 56 is in open position to receive a portion of the heating air circulating through the line 40 to prevent undesirably chilling of the puffing gun chamber 53. Following the closure of the butterfly valve 33, the valve 56 is closed to permit the discharge of the puffing gun, which follows immediately thereafter.

During the heating cycle period, the succeeding batch of cereal grains is pressurized by shutting the valve 25, and opening valve 24 in the same manner as previously described. Similarly, the heating cycle for the succeeding batch is accomplished by opening the valve 17 leading into the heating chamber, and then closing the valve 17. During admission of the pressurized grain into the heating vessel 27, the by-pass valve 51 is in operation and valve 41 is closed.

The above described operating procedure may be performed by a conventional timing mechanism (not shown) or by hand, if so desired.

*Example 1*

Forty-eight (48) ounces of rice grains are admitted into a pressure chamber and subjected to a pressure of 200 p.s.i.g. The pressurized rice is then transferred to a heating vessel and heated to a temperature of about 500° F. for approximately 3 minutes to gelatinize the starch granules therein. Upon completion of the gelatinization, the rice is fed into a pre-heated pressure gun chamber and discharged into a bin at atmospheric pressure, causing the rice to assume the puffed form. The entire operation takes approximately 3 minutes or less. In contrast, the conventional method of heating, pressurizing and sudden decompression of a similar amount of rice in a single chamber takes approximately 8½ to 11 minutes.

*Example 2*

Example 1 is repeated substituting for the rice grains, wheat grains. According to the conventional method of puffing wheat, the process takes at least 8½ to 11 minutes, whereas the present method takes approximately 3 minutes or less.

*Example 3*

Example 1 is repeated substituting for the rice there used, corn. The entire operation takes 3 minutes in contrast with the conventional operating time of 8½ to 11 minutes.

From the above description it will be seen that the present apparatus for heating a fluidized bed of cereal with a gaseous heating medium is admirably suited for a large scale continuous production of puffed cereal products, and provides improved means for achieving a superior and more uniformly treated product.

It will be understood that modifications and variations may be effected without departing from the spirit and scope of the invention.

What is claimed is:

1. An apparatus for heating cereal grain comprising a heating chamber for gelatinizing a charge of cereal grain, means for introducing said charge of cereal grain into said chamber under pressure, said heating chamber having a gas heat inlet and a gas heat outlet for passing gas heat through said chamber in heat exchange with the cereal grain therein, a solids outlet to transfer heated cereal grain from said heating chamber, a recycle line connecting said gas heat inlet and said gas heat outlet, said recycle line having interposed therein a gas circulating pump and a heater, said solids outlet comprising a rotatable apertured plate operable in closed position to retain said cereal grain in said chamber while permitting the entry therethrough of gas heat.

2. Apparatus according to claim 1, said means for introducing said charge of cereal grain comprising a pressure chamber having an inlet line for admitting cereal grain therein, an outlet line for removably transferring said cereal grain from said pressure chamber to said heating chamber, a conduit line in communication with said pressure chamber for introducing therein compressed gas and a vent line, said inlet, outlet vent and conduit lines each having valve control means, whereby opening of said inlet vent valves allows the entry of said charge of cereal grain into said pressure chamber, the closing of said inlet and vent valves and the opening of said conduit valve allows the pressurization of said pressure chamber, and the opening of said discharge valve allows the passage of pressurized cereal grain into said heating chamber.

3. Apparatus according to claim 2 and a common compressed gas source for supplying compressed gas to said conduit line and said recycle line.

4. In combination with the apparatus of claim 1, a puffing apparatus comprising a gun chamber for receiving the cereal grain products from said heating chamber, and valve means for rapidly decompressing said gun chamber to effect puffing of the cereal grain products and simultaneous discharge from said gun chamber of said products in puffed form.

5. A puffing apparatus for puffing whole grains in a continuous process comprising a cylindrical tank for pre-pressurizing grain, said tank disposed with its axis vertical, an inlet leading into the top of the tank and through which the grain falls into the tank, a compressor for supplying air pressure, an inlet duct in said tank communicating with said compressor, a cooking chamber disposed below said pre-pressurizing tank, a duct leading from said pre-pressurizing tank to said cooking chamber, a normally closed valve in said duct which when open permits grain to gravitate to the cooking chamber under air pressure from said pre-pressurizing tank, a rotatable porous plate in said cooking chamber forming a bed for said grain, an air inlet at the bottom end and an exhaust outlet at the top of said cooking chamber, said inlet communicating with said compressor, a circulating blower and an air heater interposed between said compressor and said cooking chamber inlet, a valve controlled by-pass shunting said circulating blower and said air heater, a grain puffing gun communicating with said cooking chamber, and means for transferring gelatinized grain under pressure from said cooking chamber to said puffing gun.

6. A puffing apparatus according to claim 5 wherein said pre-pressurizing tank, said cooking chamber and said puffing gun are cyclically operated by valves in circuitry therewith.

7. In an apparatus according to claim 6, and timing means for controlling said valves whereby said puffing gun may be depressurized when said cooking chamber is in operation.

References Cited in the file of this patent

UNITED STATES PATENTS

| | | |
|---|---|---|
| 2,116,212 | Plews | May 3, 1938 |
| 2,598,242 | Ernest | May 27, 1952 |
| 2,785,070 | Kester | Mar. 12, 1957 |
| 2,808,333 | Mikus | Oct. 1, 1957 |